(12) United States Patent
Lerner et al.

(10) Patent No.: US 6,169,802 B1
(45) Date of Patent: Jan. 2, 2001

(54) DYNAMIC PRIVATE KEY SECURITY SYSTEM FOR PERSONAL MESSAGING DEVICES

(75) Inventors: Kenneth Lerner, Boca Raton; John Burgan, Palm Beach, both of FL (US)

(73) Assignee: Motorola, Inc., Schaumburg, IL (US)

( * ) Notice: Under 35 U.S.C. 154(b), the term of this patent shall be extended for 0 days.

(21) Appl. No.: 08/768,761

(22) Filed: Dec. 17, 1996

(51) Int. Cl.[7] ........................................ H04L 9/00
(52) U.S. Cl. ........................................................ 380/44
(58) Field of Search ................................ 380/21, 49, 43, 380/44

(56) References Cited

U.S. PATENT DOCUMENTS

| | | | |
|---|---|---|---|
| 4,074,066 | * 2/1978 | Ehrsam et al. | 380/49 |
| 4,805,216 | * 2/1989 | Gruenberg | 380/21 |
| 4,926,478 | * 5/1990 | Gruenberg | 380/21 |
| 5,029,210 | * 7/1991 | Gruenberg | 380/21 |
| 5,247,576 | * 9/1993 | Bright | 380/21 |
| 5,319,712 | * 6/1994 | Finkelstein et al. | 380/49 |
| 5,455,862 | * 10/1995 | Hoskinson | 380/21 |
| 5,455,864 | * 10/1995 | Park | 380/43 |

* cited by examiner

Primary Examiner—Salvatore Cangialosi
(74) Attorney, Agent, or Firm—Pablo Meles (57) ABSTRACT

A dynamic private key security system for personal messaging devices (200) includes a paging terminal (112). The paging terminal (112) has a terminal cryptographic engine (111) that generates an encrypted message using a terminal session key based on a first information content of a prior message, and generates a next message key based on a second information content of a current message. The terminal session key is used to encrypt the current message, and the next message key is used to encrypt a next message.

22 Claims, 5 Drawing Sheets

DYNAMIC PRIVATE KEY SECURITY SYSTEM FOR PERSONAL MESSAGING DEVICES

FIELD OF THE INVENTION

This invention relates in general to selective call signaling systems and more particularly to selective call signaling system that transports secure messages.

BACKGROUND OF THE INVENTION

In conventional selective call signaling systems, messages are "encoded" using methods and algorithms that provide immunity from channel based errors, e.g., multipath or simulcast distortion, or received power fading. These methods provide minimal protection from an individual that might monitor the communication channel, since commercially available products (e.g., channel test sets, monitors, communication analyzers and the like) can easily display the address and message information intended for one or more selective call signaling devices, or messaging devices. Consequently, manufacturers and developers of selective call signaling systems are investigating using channel based cryptographic techniques to encrypt, transmit, receive, and decrypt message information. This will allow a subscriber to receive messages containing sensitive business information without any fear that the information would be easily compromised.

Current cryptographic techniques fall into two general categories, public and private key systems. In a public key system, the user holds a secret key, known only to that user, and publishes a public key, usable by anyone to encrypt and send messages to the user. The public key encrypted message can only be decrypted by a user using the secret key. Public key systems essentially eliminate the need for exchange of a session key. A session key is a key known to both sender and recipient, useful only during a finite time associated with a secure messaging session or transaction. By removing this requirement, the security of the system is enhanced because in order to break the encryption, an eavesdropper must know the private key.

Public key cryptography, such as that which uses the RSA algorithm, (the name "RSA" is derived from the first letter of its inventors last names, Ron Rivest, Adi Shamir and Leonard Adleman), is based on the mathematical concept of a "one-way function." One way functions are those that are much easier to perform in one direction than the other. Moreover, RSA uses large relatively prime numbers, 'p' and 'q'. By multiplying 'p' and 'q' together, an even larger number, 'n' is produced. Next another large number, 'e' is chosen, such that 'e' is less than 'n' but still relatively prime with respect to the product of p−1 and q−1. The numbers 'n' and 'e' constitute what is called the public key, and the private key, 'd', can be computed using a mathematical formula relating 'e', 'p', and 'q'. To encrypt data, the algorithm counts the bits of data contained in the data block to be encrypted, and raises the quantity to the power of 'e' and divides by 'n' creating the remainder (this is modulo arithmetic). To decrypt that same data block, the algorithm raises it to the power of 'd' and divides by 'n' keeping the remainder. The key size used by RSA may be varied depending on the level of security the user demands. A larger key number results in a more difficult to factoring problem, and therefore, a more secure system. By way of example, a 1024 digit number that is itself the product of two prime numbers would have only four factors (the number itself, 1, and the two prime numbers multiplied to derive the number). Finding the factors of the 1024 digit number on a state of the art super computer is computationally infeasible, taking as long as several centuries to complete.

Although the RSA cryptographic algorithm is an acceptable method for insuring security of wireless messages, the processor power needed to implement a real time RSA decoder in a personal messaging device is prohibitive based on battery life considerations alone. Consequently, one must either find an improved method for implementing a public key based cryptographic algorithm, or use a private key based system.

Regarding private key based systems, as stated before, they require the exchange of an identical secret key known as the session key. Consequently, at least two drawbacks exist in a conventional secret key system. First, compromise of the secret key by one user compromises the entire communications system for all users with that key. Second, since the secret key is typically handled by more than one entity in a secure communication system, the danger exists that compromise can occur at any point in that system.

Accordingly, what is needed is a secure messaging system that efficiently utilizes the benefits of either public or private key cryptography, to insure the privacy of messages communicated from a source to a destination reachable from the system, and prevent the interception and unauthorized decoding and decryption of secure messages.

DESCRIPTION OF A PREFERRED EMBODIMENT

Figure 1:
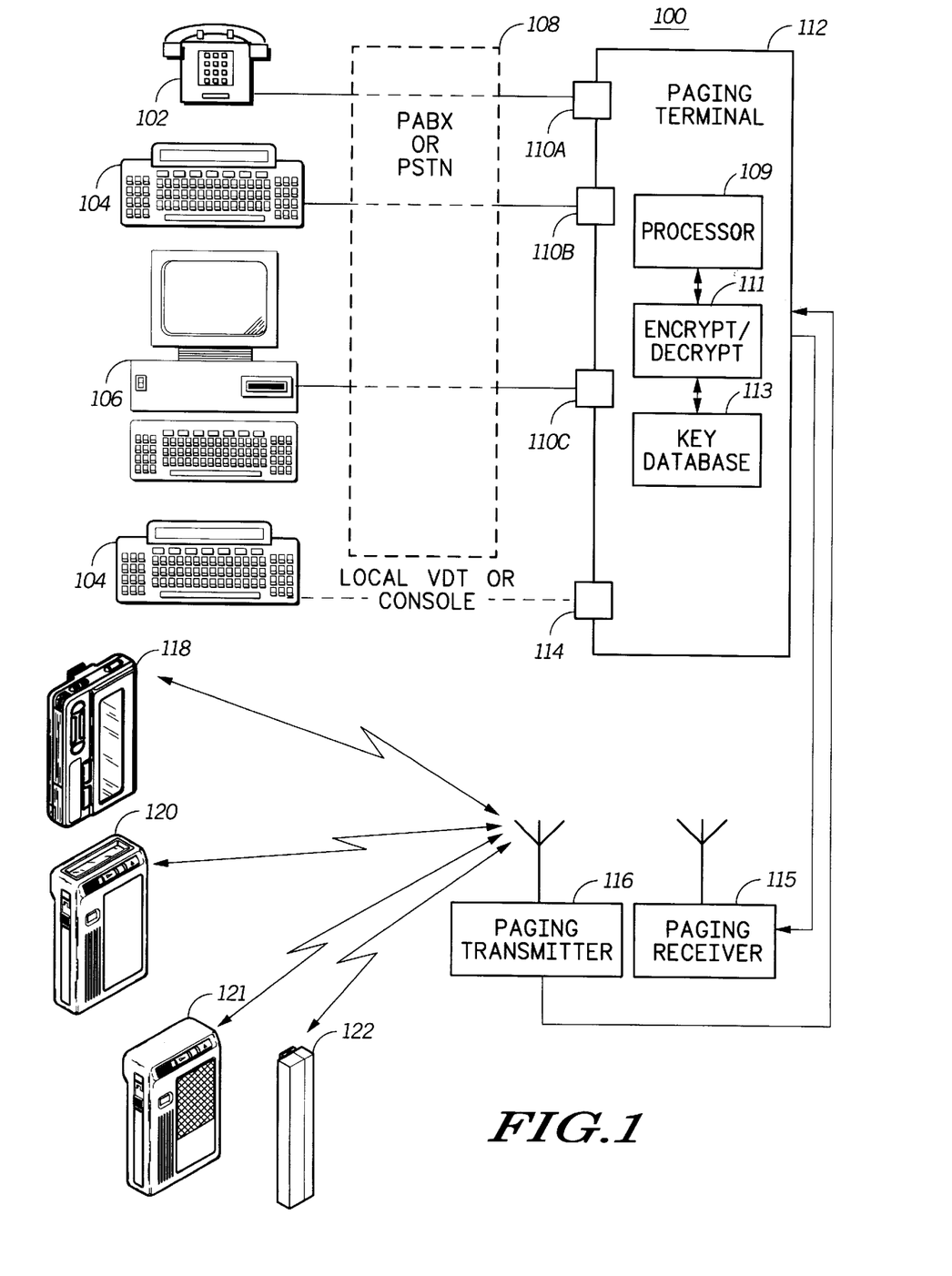
FIG. 1 is a block diagram of a conventional selective call communication signaling system configured for operation in accordance with the present invention.

Referring to FIG. 1, a communication system (e.g., a paging system 100), accepts page or messaging requests from several external sources (e.g. a telephone 102, a page entry device 104, and a computer with a modem 106). The page request is normally accepted through a telephone network input for a public or private telephone network 108, which couples the page request from one of the sources (i.e., callers) to an automatic telephone input (110A, 110B, or 110C) at a paging terminal 112. Optionally, a dedicated input 114 at the paging terminal 112 can accept a page request from a local video display terminal or console. The dedicated input 114 is usually associated with a telephone switchboard and message dispatch service that accepts the page request from a telephone caller and enters the page request into the paging terminal 112 typically via the video display terminal. Additionally, the paging terminal comprises a processor 109, a terminal cryptographic engine 111 that generates cryptographic keys as well as encrypting and decrypting messages, and a key database 113 where keys are stored for use in encrypting and decrypting messages communicated between the paging terminal 112 and a personal messaging device 118, 120, 121, 122.

After accepting the page request, the paging terminal 112 encodes and transmits, via a conventional transmitter 116, a message (i.e., a page) to a selective call receiver (e.g., a pager). Conventional paging systems may convey information from a caller to pager user via a plurality of message formats. These message formats are commonly referred to as message sources, each of which denotes a mode of data (e.g., characters, numbers, audio, graphics, or "just a beep") being sent to the pager. FIG. 1 illustrates a number of conventional selective call receivers, subscriber units, personal messaging units, personal messaging devices, or the like, that may receive information via either an alphanumeric display message page 118, a numeric display message page 120, a voice message page, 121 or a tone only page 122. In the later case, the tone only page 122 (i.e., no message page), alerts (e.g., an audible beep), the user that a caller wants the pager user to respond by calling a prearranged telephone number, such as a receptionist telephone number.

Alternatively, the paging terminal 112 is coupled with a paging receiver 115 that operates to receive reverse channel signaling information (e.g., acknowledge back pages) from a two-way capable selective call receiver. The acknowledge back response conveys information such as whether a particular message was correctly received (i.e., without errors) or possibly, a response either generated ad hoc or from a predetermined list of "canned" responses.

A conventional selective call receiver commonly receives a message, alerts the pager user, and optionally presents the message information according to a message format that is mapped to a pager address on the paging system. The unique pager address typically represents the message format (e.g., alphanumeric, numeric, voice, or tone only), supported by the selective call receiver. Therefore, by matching the unique pager address with the appropriately formatted message, a page with a specific message format may be effectively broadcast to selected personal messaging devices by the paging terminal 112.

Modern selective call receivers may be capable of receiving and presenting message information in a plurality of formats, typically using separate pager addresses mapped to the same selective call receiver. When more than one format is supported by a selective call receiver, there may be several unique sources (paging addresses) associated with the receiver that will allow correct reception of a different message format. For example, one pager address may be mapped to a numeric display message format and a second pager address may be mapped to a voice message format. Therefore, information may be conveyed from a caller to the pager user in either numeric display message format or voice message format.

Hence, the aforementioned communication system 100 is capable of receiving message information in a plurality of formats. The message formats are mapped to unique pager addresses supported by the communication system. Where more than one pager address and message format pairs are mapped to the same selective call receiver, information may be conveyed from a caller to a pager user in a plurality of message formats as discussed above.

Figure 2:
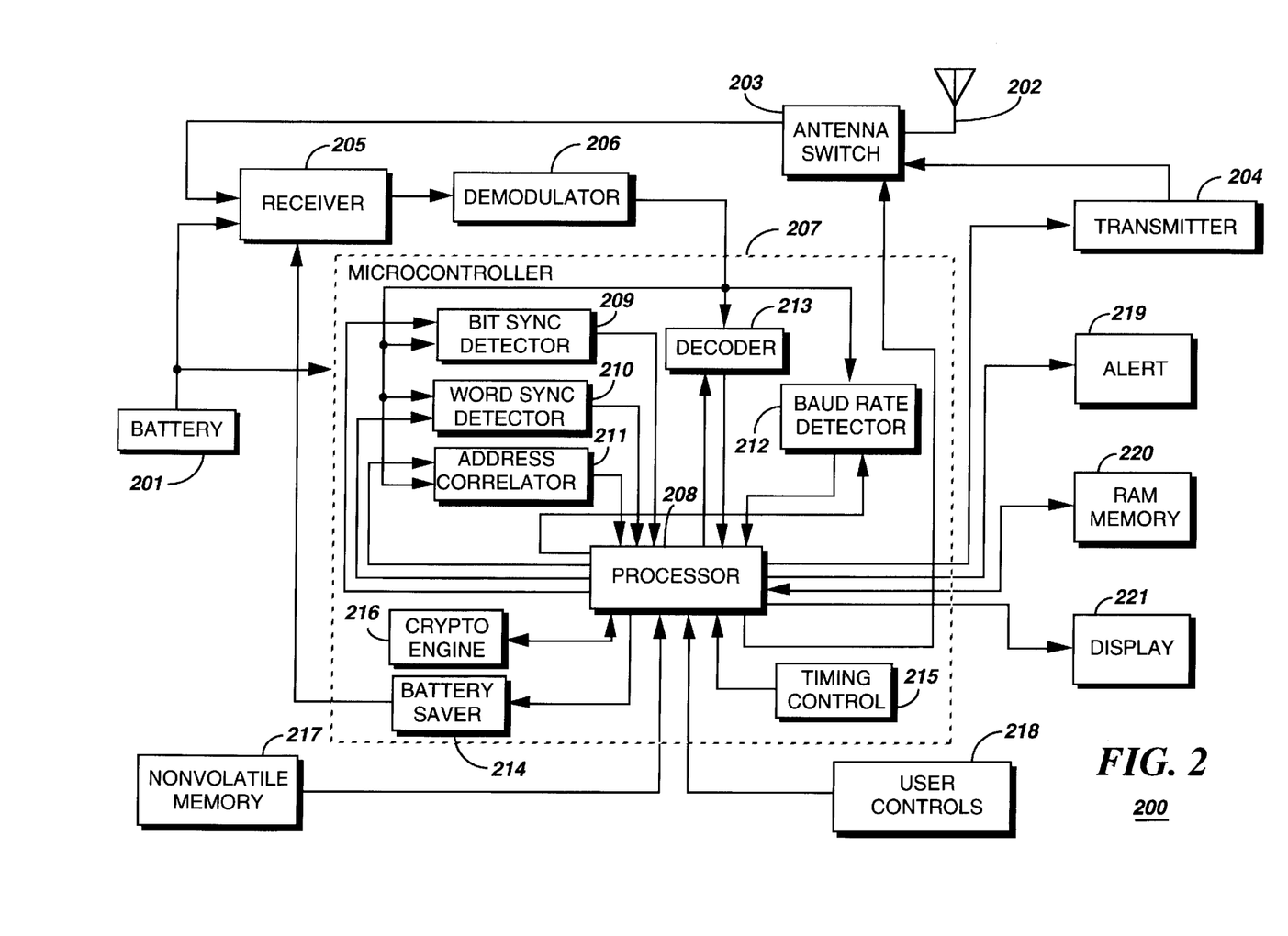
FIG. 2 is a block diagram of a typical personal messaging device for use in accordance with the preferred embodiment of the present invention.

Referring to FIG. 2, the illustration shows a typical block diagram for a personal messaging device (e.g., such shown in FIG. 1, being capable of receiving an alphanumeric message 118, a numeric message 120, a voice message 121, or a tone only message 122, in accordance with the present invention. A battery 201 supplies power to the personal messaging device 200 which operates to receive an information signal via an antenna 202. An antenna switch 203 couples the antenna 202 between one of a transmitter 204 or a receiver 205 that couples the received information signal to a conventional demodulator 206 that is capable of recovering analog or digital information. Received digital information is recovered as a serial bit stream that is then coupled to a microcontroller 207 for interpreting and decoding the serial bit stream as address, control, and data signals. In the preferred embodiment, the microcontroller 207 may comprise a processor 208, a bit synchronization detector 209, a word synchronization detector 210, an address correlator 211, a baud rate detector 212, a data decoder 213, a battery saving control circuit 214, a timing control 215, and a messaging device cryptographic engine 216, implemented in hardware, software, or a combination thereof. Examples of commercially available microcontrollers suitable for implementing the preferred embodiment of the present invention are Motorola's MC68HC05xx, MC68HC08xx, M68HC11xx, or the like. Complete descriptions of these devices are available in Motorola's data book set entitled "Microprocessor, Microcontroller, and Peripheral Data," volumes I and II, Series A, © 1995 by MOTOROLA, INC.

More specifically, in the microcontroller 207 the serial bit stream is coupled to the baud rate detector 212 that determines a receiving data rate associated with the recovered information. When the receiving data rate is determined, the bit synchronization detector 209 establishes synchronization between the microcontroller's data decoding components (208, 211, and 213) and the individual signals (e.g., address, control, and data signals) in the recovered information. Once bit synchronization is established, the word synchronization detector 210 searches the serial bit stream for information indicating the beginning of a batch or frame. When the microcontroller 207 has established both bit and word synchronization, the recovered information may be searched for a group identification code associated with the personal messaging device. When a group identification code is found corresponding to the personal messaging device, it will search only those code frames associated with it's group for pages intended for the personal messaging device. During the period between like frames, the microcontroller 207 will preferably activate the battery saver 214 to "shut-down" the receiver 205 and demodulator 206, thereby conserving power and extending battery life. The interval between like frames is known in the art as a "sleep" period. Preferably, the system protocol operates such that pages targeted for a specific group identifier, and pages intended for a particular personal messaging device, are sent only during the transmission of that peripheral's designated paging group, therefore, no pages are missed during the sleep period. A peripheral that operates in this fashion is said to be in a "battery saving" mode.

In determining the selection of the particular personal messaging device, a correlation is performed between a predetermined address associated with the personal messaging device and a received address. To accomplish this, the address correlator 211, which comprises a signal processor, performs a comparison between the address signal recovered from the received information signal and a predetermined address associated with the personal messaging device, generating a detection indicating selection of the personal messaging device when the recovered address is substantially equivalent to the predetermined address. The predetermined address or addresses associated with the personal messaging device are preferably stored in the non-volatile memory 217 or code plug. Optionally, the non-volatile memory 217 may reside inside a support integrated circuit (not shown) or in the microcontroller 207 itself. The non-volatile memory 217 typically has a plurality of registers for storing a plurality of configuration words that characterize the operation of the personal messaging device. When a detection is generated, the microcontroller 207 may generate an alert responsive to a selected alerting mode, e.g., a tone alert would be generated when a tone-only mode is selected. Alternatively, in response to a valid data address correlation and a corresponding detection, the decoder 213 operates to decode at least one message from the received information signal and couples message information to the RAM memory 220.

In accordance with the recovered information, the programmed operating parameters stored in the non-volatile memory 217, and settings associated with the user controls 218, the personal messaging device may present at least a portion of the message information, such as by a display 221. Alternatively, the user may be alerted that a message has been received by an alert transducer 219 that generates an audible, visual, or tactile alert. The user may view received message information on the display 221 by manually activating an appropriate user control 218 such as a message read control (not shown).

The microcontroller 207 may also include items such as a conventional signal multiplexer, a voltage regulator and control mechanism, a current regulator and control mechanism, environmental sensing circuitry such as for light or temperature conditions, audio power amplifier circuitry, control interface circuitry, and display illumination circuitry. These elements are arranged in a known manner to configure the personal messaging device as requested by a customer.

In the preferred embodiment, upon receipt or storage of a message, the processor 208 communicates the received message to the messaging device cryptographic engine 216 for decryption of a clear text message and subsequent generation of a message decryption key. Upon successful reception and decoding of the clear text message, the transmitter 204, as instructed by processor 208, generates an acknowledge back response to the paging terminal 112 indicating that the message has been correctly received and decoded. However, if the decoder 213, or messaging device cryptographic engine 216 cannot successfully decode and decrypt the clear text message, a negative acknowledge back response is returned to the paging terminal 112 indicating that the message has not been correctly received and decoded.

In this way, the personal messaging device 200 gives a paging subscriber the option of operating as a conventional standalone selective call paging receiver, that is, receiving, storing and displaying messages. It further allows the secure communication of messages containing sensitive information that is protected from unauthorized users using cryptographic techniques.

Figure 3:
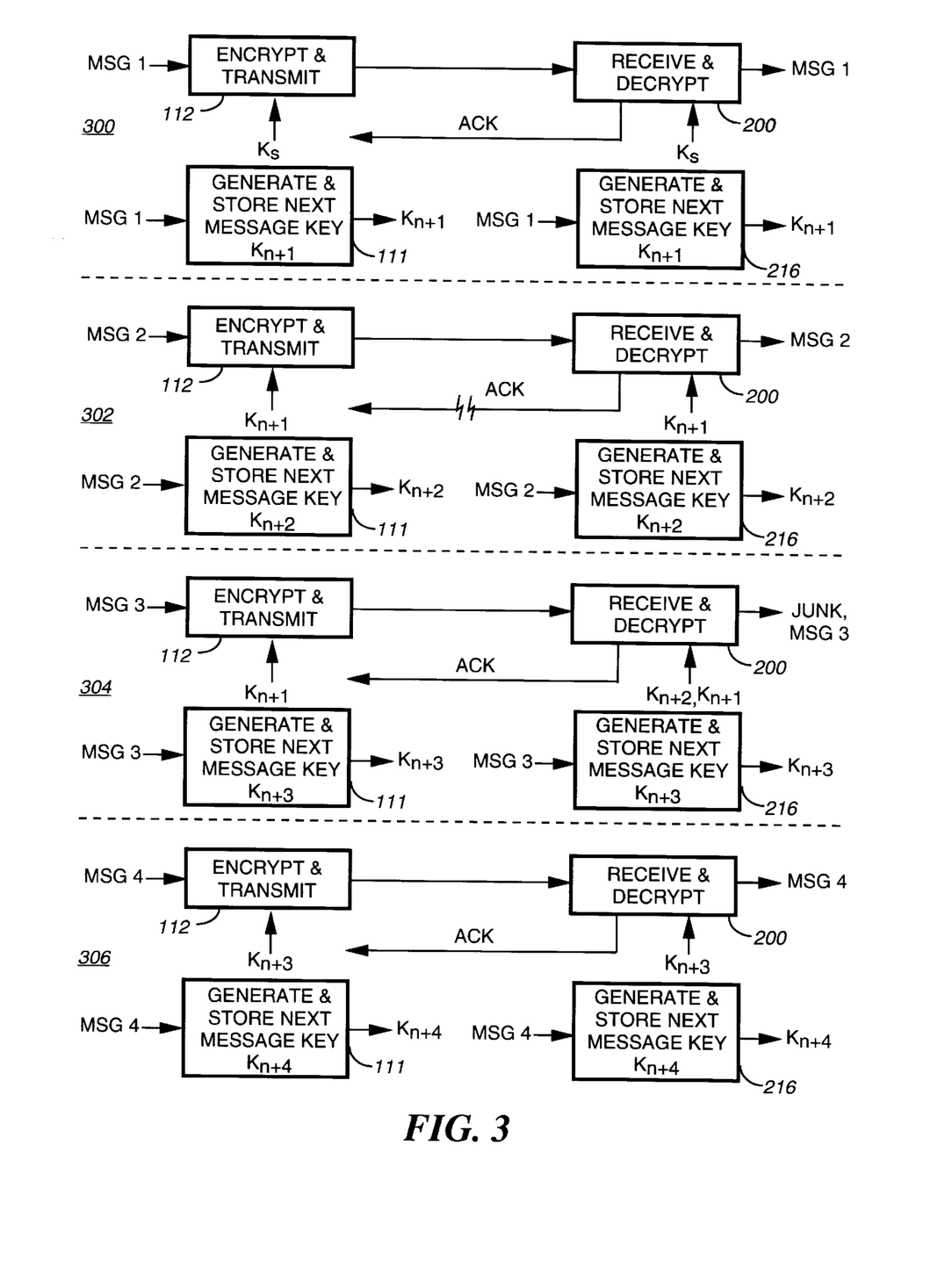
FIG. 3 illustrates several related examples of signal flow between a paging terminal and a personal messaging device in accordance with the present invention.

Referring to FIG. 3, the illustration shows several related examples of signal flow between a paging terminal and a personal messaging device in accordance with the present invention of the dynamic private key security system.

To keep transmitted data secure, it must be encrypted before transmission over the air. The receiving device 200 must then decrypt the encrypted message using a decryption key. Because a personal messaging device 200 typically has limited computing resources, e.g., a small microcontroller 207 with limited RAM 220 and ROM 217 (also referred to as a codeplug or non-volatile memory), the cryptographic algorithm should not be particularly complicated. In addition, it is also desired to minimize the transaction bandwidth of an over-the-air messaging channel. This implies that long encryption codes should not be sent over the air.

Accordingly, a typical application and transaction sequence, using a fixed encryption and decryption key, stored in the personal messaging device 200, and the paging terminal 112 is used. However, according to the preferred embodiment of the present invention, the key (know as a secret or private key) is fixed, only for the length of the session or message transaction. This is necessary because a system that uses the same private key over a long period of time can be compromised as follows. A person wanting to decipher encrypted message data, hereafter known as an eavesdropper or unauthorized user, can monitor over the air transmissions and eventually discern the private key, and thus compromise the system's security. After the private key is broken, all future messaging traffic can be intercepted and deciphered by the eavesdropper. To prevent the encryption key from being discovered by the eavesdropper, it must be changed often. Accordingly, in the present invention, the key is automatically updated based on the decrypted data contained in each correctly received message.

The present invention employs a method to create a dynamic private key. Two important features of this invention are that its method is computationally and bandwidth efficient. Essentially, the system dynamically changes the private key (known to the paging terminal 100 and personal messaging device 200) based on a content of a previously transmitted message. By dynamically changing the key, encrypted data is much more difficult to decipher. Even if one particular message is deciphered, future messages will still be protected.

There are many methods available to create the dynamic key through non-computationally complex methods. For example, the dynamic key can be created by a simple manipulation of the checksum of the previous page received by the messaging device. As illustrated in FIG. 3, both the messaging device 200 and paging terminal 112 generate and store a dynamic key, in this case noted as a next message key $k_{n+1}$. The simple manipulation mentioned above may comprise a simple command such as complement or rotate instruction, or an addition or subtraction. The dynamic key can also be created by using the electronic serial number or other unique identification code (e.g., a message number or the like) associated with the messaging device in conjunction with the received message. Creating the key based on a combination of both message data and other unique attributes relating to the messaging device is attractive because message data can often be identical. If the message data is identical, and the key is generated solely based on the message data, then the new private key may be identical to the previous one. However, if the messaging device or paging terminal finds that the new key is identical to the old key, the messaging device or terminal can manipulate the new key in a specified manner such that a unique key is generated each and every time.

In section 300 of FIG. 3, the signal flow diagram shows a message MSG1 that is encrypted using a terminal session key $k_s$ corresponding with an initial key $k_{initial}$ that was generated by the paging terminal 112 and stored in a key database 113 (see FIG. 4) as a terminal session key. An identical initial key $k_s$ is also stored in the non-volatile memory 217 of the personal messaging device 200 as an initial messaging device session key, so the messaging device cryptographic engine 216 can perform decryption of the encrypted message MSG1_ENC. Contemporaneously, the paging terminal 112 using its associated terminal cryptographic engine 111, generates and stores the next message key $k_{n+1}$ based at least on an information content of the message MSG1, which becomes a prior message once it has been sent. The next message key $k_{n+1}$ will be used to encrypt a next message MSG2 for transmission to the personal messaging device 200.

The encrypted message MSG1_ENC is generated by the paging terminal 112 and broadcast for reception by selected personal messaging devices, e.g., the personal messaging device 200. The personal messaging device 200 receives and decodes the encrypted message MSG1_ENC as a current received encrypted message, and decrypts the current received encrypted message using the messaging device session key, resulting in a decrypted received message identical to the message MSG1. The contents of the recovered decrypted message MSG1 are then applied to the messaging device cryptographic engine 216, and as discussed in reference to the paging terminal 112 and its associated terminal cryptographic engine 111, the messaging device cryptographic engine 216 associated with the personal messaging device 200, generates and stores the next message key $k_{n+1}$ (messaging device session key) based at least on a content of the recovered decrypted message MSG1. Note that if the recovered decrypted message MSG1 is without errors, the next message key $k_{n+1}$ (messaging device session key) stored in the personal messaging device 200 will be identical to the next message key $k_{n+1}$ (terminal session key) stored in the paging terminal 112.

The personal messaging device 200 determines whether the recovered decrypted message MSG1 is without errors using conventional techniques such as a message checksum, cyclic redundancy code (CRC), block code, BCH syndromes, or the like. The message checksum or CRC may be performed on the actual clear text of the message, on the encrypted message, or on both, depending on the desired implementation. One of ordinary skill in the art will readily recognize that many methods are available for coding and decoding messages (i.e., information) that offer both error detection and error correction. Accordingly, a system designer will choose the best trade off between error detection, correction, to achieve optimal utilization of the available channel bandwidth.

When the recovered decrypted message MSG1 (current received decrypted message) is determined to have been received without errors, i.e., the personal messaging device 200 correctly decoded and decrypted the encrypted message MSG1_ENC, the personal messaging device 200 sends an affirmative message received acknowledgment response (ACK) to the paging terminal 112, using the processor 208 which executes a conventional message acknowledgment routine (not shown) and the transmitter 204. On the other hand, if the recovered decrypted message MSG1 is determined to have been received with errors, i.e., the personal messaging device 200 either did not correctly decode or decrypt the encrypted message MSG1_ENC, the personal messaging device 200 sends a negative message received acknowledgment response (NACK) to the paging terminal 112.

If a NACK is received by the paging terminal 112, the paging terminal 112 will encrypt a next message for transmission to the personal messaging device 200 using the next message key $k_{n+1}$ generated for use with the message that was NACKed. The regenerated (re-encrypted) message can then be rebroadcast to the personal messaging device. Similarly, since the personal messaging device 200 knows that the last received message contained uncorrectable errors, it will use the same next message key $k_{n+1}$ (terminal session key) as used be the paging terminal 112, that is, the key that was generated for use with the message that was NACKed. By operating in this fashion, there is no chance of the personal messaging device 200 losing synchronization with the paging terminal 112, because the paging terminal 112 receives positive and negative acknowledgments of message reception. Thus, it is almost absolutely guaranteed that the personal messaging device 200 and paging terminal 112 will always be using the same session key (terminal session key=messaging device session key).

Section 302 of FIG. 3 shows the only exception to the above case, when an acknowledgment response is not received by the paging terminal 112. In section 302, the acknowledgment response may have been blocked by a physical barrier, distorted, or possibly obliterated due to interference. Accordingly, the personal messaging device 200 has no knowledge that the response was not received by the paging terminal 112, although the most recently received, decoded, and decrypted message MSG2 was decoded and decrypted without errors. The paging terminal 112 has already generated and stored a new terminal session key $k_{n+2}$ (or next message key $k_{n+2}$) for encrypting the next message. However, since no acknowledgment is received, the key $k_{n+2}$ is discarded by the paging terminal 112, and it is assumed that the terminal session key≠messaging device session key. Similarly, the key $k_{n+2}$ (messaging device session key) must be discarded because the personal messaging device 200 can't decrypt a message encrypted with a key that it potentially did not receive. Consequently, when a NACK acknowledgment response is received, or no acknowledgment response is received, the key $k_{n+2}$ is assumed not to have been received. Alternatively, if a NACK is received, the same message can be re-sent and encrypted using the session key from the last message that was acknowledged as being received, decoded, and decrypted without errors, as discussed above. For this reason, the personal messaging device 200 retains the previous "next message key $k_{n+1}$" as well as the current next message key $k_{n+1}$ generated based on the last message decoded and decrypted without errors.

Referring to section 304, the paging terminal 112, having not received the acknowledgment response in section 302, will send the next message MSG2 using a same session key (next message key $k_{n+1}$) previously used to encrypt the last message received, decoded, decrypted, and acknowledged as being without errors (MSG1). MSG3 is encrypted using a session key=next message key $k_{n+1}$, and that the "new" next message key $k_{n+3}$ is generated from the message MSG3. The personal messaging device 200 receives and decodes (without errors, according to the decoding procedure) an encrypted message MSG3_ENC. The fact that the message was decoded without errors indicates that the message is a good message, at least according to the coding procedure chosen. Based on that fact, if personal messaging device 200 does not correctly decrypt the encrypted message MSG3_ENC using the session key=next message key $k_{n+2}$, (the resulting decryption is indicated as JUNK) which was discarded by the paging terminal after not receiving the acknowledgment response, and second decryption of the encrypted message MSG3_ENC is performed using the session key=next message key $k_{n+3}$, which results in a successful decryption of the message MSG3.

In this fashion, the personal messaging device 200 can re-synchronize itself to the paging terminal 112, thus maintaining the security of messages transmitted to the personal messaging device 200.

Referring to section 306 of FIG. 3, the last signal flow diagram shows a message MSG4 that is encrypted using a session key $k_s$ corresponding with the next message key $k_{n+3}$ that was generated by the paging terminal 112 and stored in a key database 113 in section 304. An identical next message key $k_{n+3}$ was also generated by the personal messaging device 200 and stored in its non-volatile memory 217, so the messaging device cryptographic engine 216 can perform decryption of the encrypted message MSG4. As in each example of FIG. 3, the paging terminal 112 using its associated terminal cryptographic engine 111, contemporaneously generates and stores a next message key $k_{n+4}$ based at least on a content of the message MSG4. The next message key $k_{n+4}$ will be used to encrypt a next message MSG5 (not shown) for transmission to the personal messaging device 200. From this and the other signal flow diagrams illustrated and discussed in reference to FIG. 3, it can be plainly seen that MSG4 is received, decoded, and decrypted using the next message key $k_{n+3}$, and its successful decoding and decryption is acknowledged to the paging terminal 112.

Figures 4, 5:
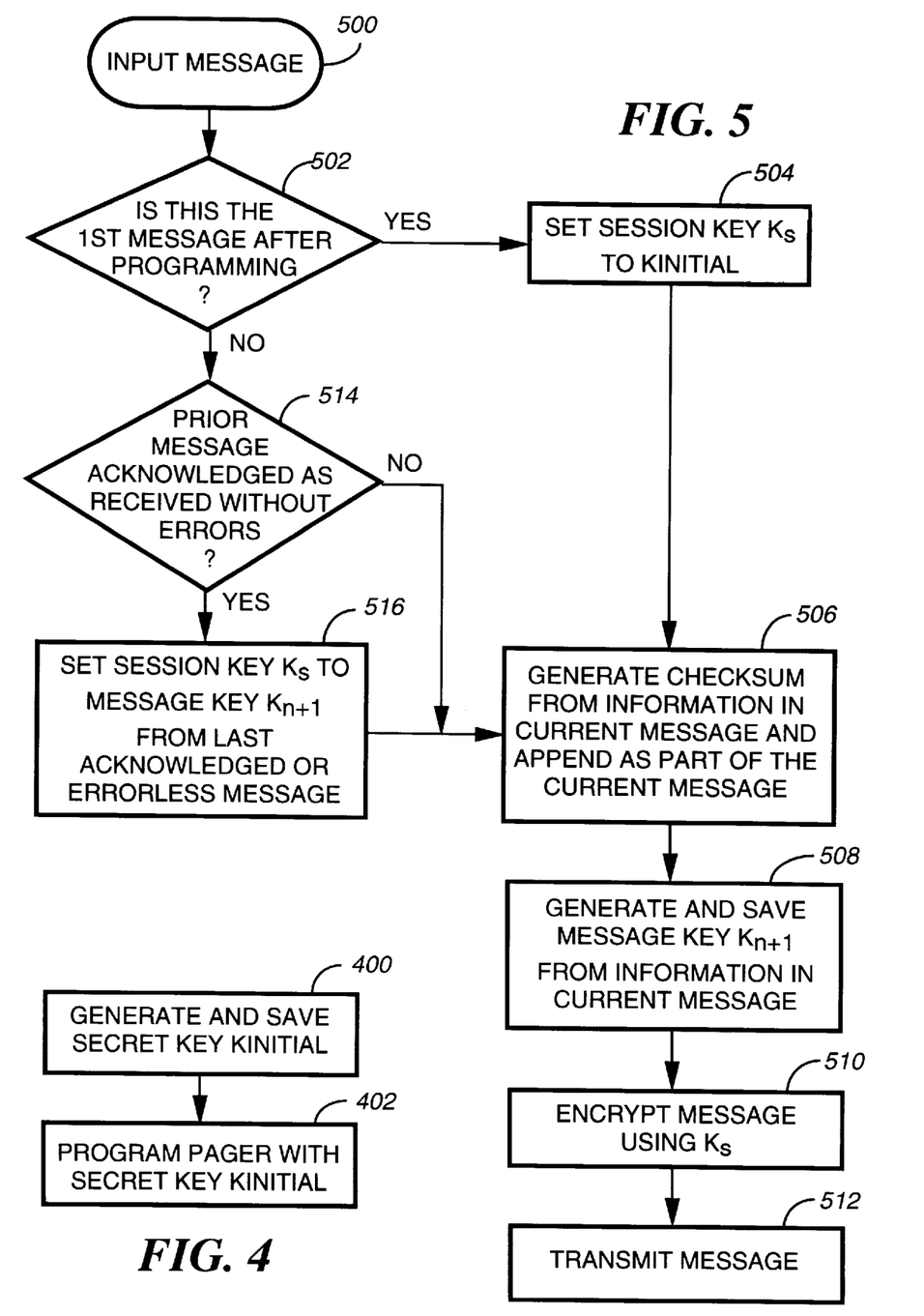
FIG. 4 is a flow diagram of the generation and programming of an initial private key for use by the paging terminal and personal messaging device.
FIG. 5 is a flow diagram of the personal messaging device decryption process in accordance with the preferred embodiment of the present invention.

Referring to FIG. 4, the illustration shows a flow diagram of the generation and programming of an initial private key for use by the paging terminal and personal messaging device.

The paging terminal 112 generates and stores 400 initial secret key in the key database 113. The personal messaging device 200 can then be programmed 402 with the same initial secret key and is ready for operation.

Referring to FIG. 5, the illustration shows a flow diagram of the personal messaging device decryption process in accordance with the preferred embodiment of the present invention.

As discussed with reference to FIG. 3, a message MSG1 or the like is input 500 to the paging terminal 112 using means such as described with reference to FIG. 1. The procedure checks if this is the first message to be sent to the personal messaging device 200 after programming 502. If so, the session key $k_s$ is set to the initial key $k_{initial}$, a checksum is generated from the information in a current message and appended as part of the current message 506. The paging terminal then generates a next message key $k_{n+1}$ based on a second information content of a current message, saves the next message key $k_{n+1}$ 508 for encrypting a next message, encrypts the message using the session key $k_s$ 510, and transmits the encrypted message 512.

If the message was not the first after programming, step 502 fails, and step 514 test if the prior message was acknowledged as being received without errors. If the prior message was not acknowledged or was acknowledged as being received with errors, the session key $k_s$ remains set to the same session key (the prior next message key $k_{n+1}$) as the prior last message received, decoded, decrypted, and acknowledged as being without errors. On the other hand, if the prior message was acknowledged as being received without errors, the session key $k_s$ is set to the message key $k_{n+1}$ corresponding with the last message received, decoded, decrypted, and acknowledged as being without errors 516. This procedure allows the paging terminal 112 message encryption key (or session key $k_s$) to remain at the last acknowledged key until the personal messaging device 200 properly acknowledges receipt, decoding, and decryption of the message sent by the paging terminal 112. In this manner, key synchronization is maintained between the paging terminal 112 and the personal messaging device 200.

Following determination of the session key $k_s$, steps 506, 508, 510, and 512 proceed as previously described.

Figure 6:
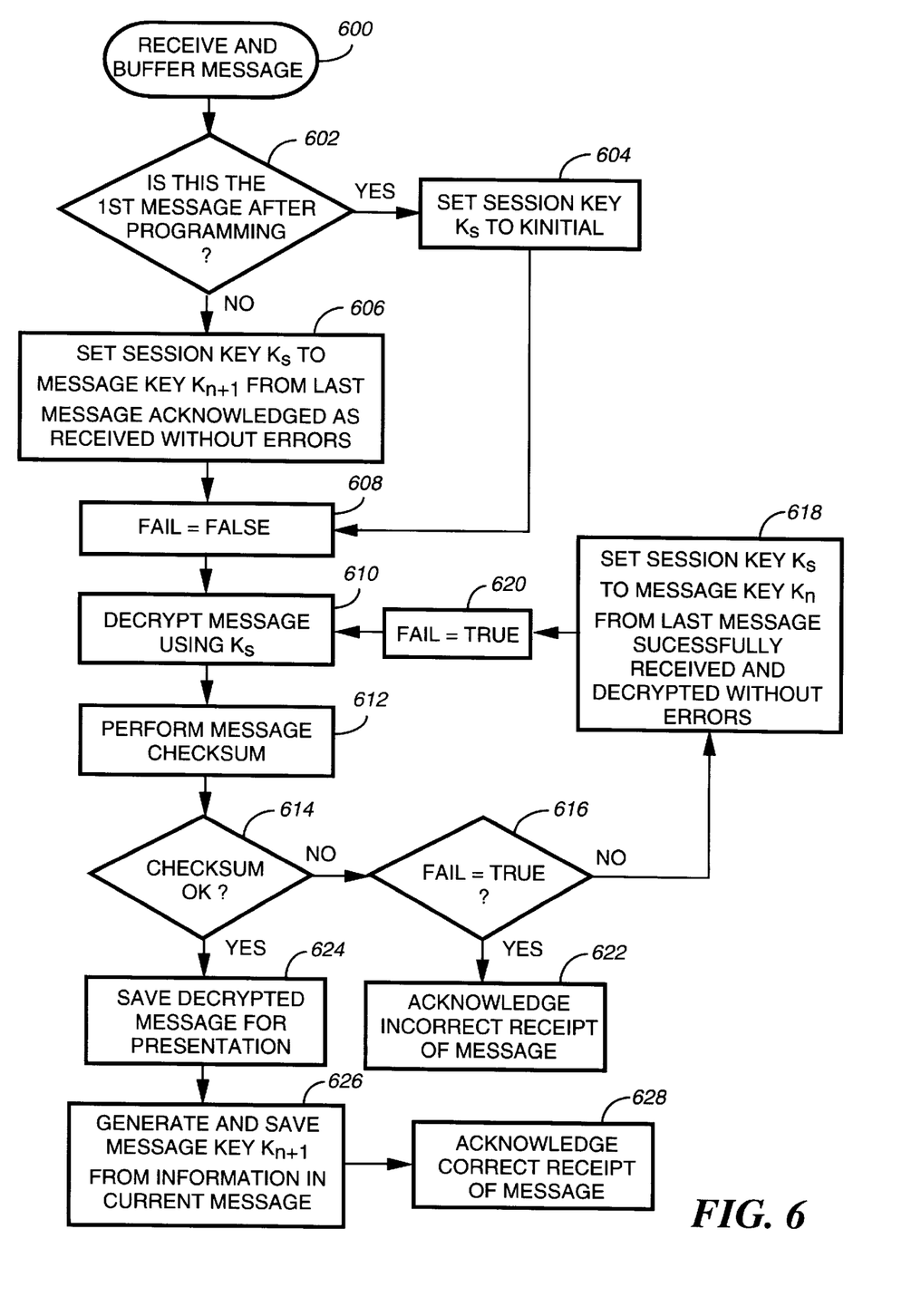
FIG. 6 is a flow diagram of the terminal encryption process in accordance with the preferred embodiment of the present invention.

Referring to FIG. 6, the illustration shows a flow diagram of the terminal encryption process in accordance with the preferred embodiment of the present invention.

The personal messaging device 200 receives, decodes, and buffers the encrypted message 600 as the current received encrypted message. The messaging device session key used here is based on a third information content of a prior received decrypted message. In this manner, the key used to decrypt correctly acknowledged messages is transported to the personal messaging device 200 as part of the current received encrypted message. The personal messaging device 200 then tests if this is the first message received after programming. If so, the session key $k_s$ is set to the initial key $k_{initial}$ and a decryption failure flag is set to false 608. The current received encrypted message is then decrypted 610 using the session key $k_s$ derived from either the initial key $k_{initial}$ or as above, using the third information content of the prior received decrypted message that is virtually identical to the first information content of the prior message.

The decoder 213 coupled to the processor then operates to detect and correct errors in the encrypted message creating a decoded message that is coupled to the messaging device cryptographic engine for decryption, creating the current received decrypted message that is further coupled to the processor for message integrity testing using a message checksum, that is computed and compared with a checksum 614 extracted from the current received encrypted message after decryption. If the computed and extracted checksums are different, step 614 fails and step 616 checks to see in the decryption failure flag is true. If the decryption failure flag is false, step 618 sets the session key $k_s$ to the message key $k_n$ from the last message successfully received and decrypted without errors. In the case of this being the first message received since programming of the personal messaging device 200, the session key $k_s$ remains set to the initial key $k_{initial}$. The decryption failure flag is set to true 620, and steps 610, 612, 614 and 616 are repeated as necessary. If the message is successfully decrypted and the checksum compares with the received message checksum, the message is saved for presentation 624 and the next message key $k_{n+1}$ (which will become a next messaging device session key) is generated 626 an stored, and the correct receipt, decoding, and decryption of the message is acknowledged (ACKed) 628. The next messaging device session key is generated by the messaging device cryptographic engine 216 based on a fourth information content of the current received decrypted message, the fourth information content being virtually identical to the second information content of the current message, and the next messaging device session key being used to decrypt a next received encrypted message.

If decryption had twice failed 616, the message would be negatively acknowledged (NACKed) as being incorrectly received, decoded, or decrypted 622.

As can be appreciated by one of ordinary skill in the art, this invention can be realized in a number of embodiments of which the disclosed embodiment is only one of many equivalent alternatives. The encryption methods and procedures, as well as the wireless protocols, are illustrated by way of example, and future improvements in these area can easily be adapted to accommodate the principles embodied in the present invention.

We claim:

1. A dynamic private key security system for personal messaging devices, comprising a paging terminal, comprising:
   a terminal cryptographic engine that generates an encrypted message using a terminal session key based on a first information content of a prior message transmitted by the paging terminal, and generates a next message key based on a second information content of a current message to be transmitted by the paging terminal, the terminal session key being used to encrypt the current message and the next message key being used to encrypt a next message.

2. The dynamic private key security system for personal messaging devices according to claim 1, wherein the paging terminal further comprises:
   a telephone network input that accepts messaging requests from external sources.

3. The dynamic private key security system for personal messaging devices according to claim 1, wherein the dynamic private key security system further comprises a personal messaging device, comprising:
   a messaging device cryptographic engine that decrypts the encrypted message as a current received decrypted message using a messaging device session key that is based on a third information content of a prior received decrypted message, the third information content of the prior received decrypted message being virtually identical to the first information content of the prior message, and the messaging device session key being identical to the terminal session key, the messaging device cryptographic engine further operating to generate a next messaging device session key based on a fourth information content of the current received decrypted message, the fourth information content being virtually identical to the second information content of the current message, and the next messaging device session key being used to decrypt a next received encrypted message.

4. The dynamic private key security system for personal messaging devices according to claim 3, wherein the personal messaging device further comprises:
   a non-volatile memory coupled to the messaging device cryptographic engine for storing the messaging device session key and the next messaging device session key.

5. The dynamic private key security system for personal messaging devices according to claim 3, wherein the personal messaging device further comprises:
   a processor; and
   a decoder coupled to the processor, the decoder operating to detect and correct errors in the encrypted message creating a decoded message that is coupled to the messaging device cryptographic engine for decryption creating the current received decrypted message that is further coupled to the processor for message integrity testing.

6. The dynamic private key security system for personal messaging devices according to claim 5, wherein the personal messaging device further comprises:
   a transmitter coupled to the processor, the transmitter operating to send an acknowledge back response to the paging terminal indicating whether or not the encrypted message has been correctly received, decoded, and decrypted.

7. The dynamic private key security system for personal messaging devices according to claim 1, wherein the paging terminal further comprises:
   a key database coupled to the terminal cryptographic engine for storing the terminal session key and the next message key.

8. The dynamic private key security system for personal messaging devices according to claim 7, wherein the paging terminal further comprises:
   a processor coupled to the terminal cryptographic engine.

9. The dynamic private key security system for personal messaging devices according to claim 8, wherein the paging terminal further comprises
   a transmitter coupled to the processor, the transmitter operating under control of the processor to broadcast the encrypted message to selected personal messaging devices.

10. The dynamic private key security system for personal messaging devices according to claim 9, wherein the paging terminal further comprises:
    a receiver coupled to the processor, the receiver operating under control of the processor to receive and decode acknowledge back responses from the selected personal messaging devices indicating whether or not the encrypted message broadcast to selected personal messaging devices were received, decoded, and decrypted without errors.

11. In a dynamic private key security system, a method for communicating secure messages comprising the steps of:
    at a paging terminal:
      generating an encrypted message from a current message using a terminal session key based on a first information content of a prior message transmitted by the paging terminal; and
      generating a next message key based on a second information content of the current message to be transmitted by the paging terminal, the terminal session key being used to encrypt the current message and the next message key being used to encrypt a next message.

12. The method for communicating secure messages according to claim 11 further comprising the steps of:
    at the paging terminal:
      generating an initial key as the terminal session key and using the initial key as the terminal session key if the current message is a first message being sent after programming; and
      programming the initial key as a messaging device session key in a non-volatile memory coupled to a messaging device cryptographic engine in a personal messaging device.

13. The method for communicating secure messages according to claim 12 further comprising the steps of:
    at the paging terminal:
      broadcasting the encrypted message for reception by the personal messaging device, the encrypted message being encrypted using one of the initial key, a terminal session key based on a first information content of a prior message, and a next message key based on a second information content of a current message, the terminal session key being used to encrypt the current message and the next message key being used to encrypt a next message.

14. The method for communicating secure messages according to claim 13 further comprising the steps of:
    at the personal messaging device:

receiving the encrypted message;

decoding the encrypted message to detect and correct errors in the encrypted message and create a decoded message that is coupled to the messaging device cryptographic engine for decryption; and decrypting the decoded message as a current received decrypted message using the messaging device session key based on one of the initial key and a third information content of a prior received decrypted message.

15. The method for communicating secure messages according to claim 14 further comprising the steps of:

at the personal messaging device:

generating a next messaging device session key based on a fourth information content of the current received decrypted message; and saving the next messaging device session key in the non-volatile memory along with the messaging device session key.

16. The method for communicating secure messages according to claim 15 further comprising the steps of:

at the personal messaging device:

testing an integrity of the current received decrypted message by comparing a checksum within the current received decrypted message to a checksum calculated from a second information content of the current received decrypted message.

17. The method for communicating secure messages according to claim 16 further comprising the steps of:

at the personal messaging device:

acknowledging a correct reception, decoding and decryption of the encrypted message when the checksum within the current received decrypted message matches the checksum calculated from the second information content of the current received decrypted message.

18. The method for communicating secure messages according to claim 17 further comprising the steps of:

at the paging terminal:

receiving a positive acknowledgment from the personal messaging device;

generating a next encrypted message using the terminal session key set to the next message key; and broadcasting the next encrypted message for reception by the personal messaging device.

19. The method for communicating secure messages according to claim 16 further comprising the steps of:

at the personal messaging device:

decrypting the decoded message as a second current received decrypted message using the next message key previously used to encrypt a last encrypted message received, decoded, decrypted, and acknowledged as being without errors when the checksum within the current received decrypted message did not match the checksum calculated from the second information content of the current received decrypted message.

20. The method for communicating secure messages according to claim 19 further comprising the steps of:

at the personal messaging device:

acknowledging an incorrect reception, decoding or decryption of the encrypted message when the checksum within the current received decrypted message did not match the checksum calculated from the second information content of the current received decrypted message.

21. The method for communicating secure messages according to claim 20 further comprising the steps of:

at the personal messaging device:

maintaining the messaging device session key at one of the initial key and the next messaging device session key based on a first information content of a prior message that is identical to the third information content of a prior received decrypted message when the checksum within the current received decrypted message did not match the checksum calculated from the second information content corresponding with the current received decrypted message and the checksum within the second current received decrypted message did not match the checksum calculated from the second current received decrypted message.

22. The method for communicating secure messages according to claim 21 further comprising the steps of:

at the paging terminal:

receiving a negative acknowledgment from the personal messaging device;

regenerating the encrypted message using the terminal session key set to the next message key previously used to encrypt the last encrypted message received, decoded, decrypted, and acknowledged as being without errors; and rebroadcasting the encrypted message for reception by the personal messaging device.

* * * * *